United States Patent [19]

Zahid

[11] 4,045,861
[45] Sept. 6, 1977

[54] METHOD OF FORMING A PRESSURE ACCUMULATOR

[75] Inventor: Abduz Zahid, Los Angeles, Calif.

[73] Assignee: Greer Hydraulics, Inc., Los Angeles, Calif.

[21] Appl. No.: 697,421

[22] Filed: June 18, 1976

Related U.S. Application Data

[62] Division of Ser. No. 552,227, Feb. 24, 1975.

[51] Int. Cl.$^2$ ............................................. B23P 19/04
[52] U.S. Cl. .................................... 29/454; 29/157 R; 29/422; 138/30
[58] Field of Search ............. 29/428, 454, 469, 157 R, 29/422; 138/30; 239/96; 425/DIG. 1

[56] References Cited

U.S. PATENT DOCUMENTS

| 2,405,201 | 8/1946 | Franck | 29/422 |
|---|---|---|---|
| 2,659,128 | 11/1953 | Baldwin, Jr. et al. | 29/422 |
| 3,001,268 | 9/1961 | Greer | 29/157 R |
| 3,500,866 | 3/1970 | Greer | 138/30 |
| 3,541,833 | 11/1970 | Mercier | 29/422 X |
| 3,580,290 | 5/1971 | Sugimura | 138/30 X |
| 3,830,259 | 8/1974 | Mercier | 138/30 |
| 3,881,519 | 5/1975 | Zahid | 138/30 |

*Primary Examiner*—Victor A. DiPalma
*Attorney, Agent, or Firm*—Arthur B. Colvin

[57] ABSTRACT

The method of forming a pressure accumulator which comprises the steps of molding the mouth of the deformable separator or bladder of the pressure accumulator to one end of the cylindrical portion of an annular supporting member, inserting the annular supporting member and bladder into the open end of a cylindrical casing with the cylindrical portion of the supporting member in juxtaposition with the inner surface of said casing, said casing having the other end thereof deformed inwardly and having an axial port, fusing the other end of the cylindrical portion to the inner surface of the casing and then deforming inwardly the open end of the casing to close the latter and forming an axial port in such closed end to receive a gas charging valve.

6 Claims, 1 Drawing Figure

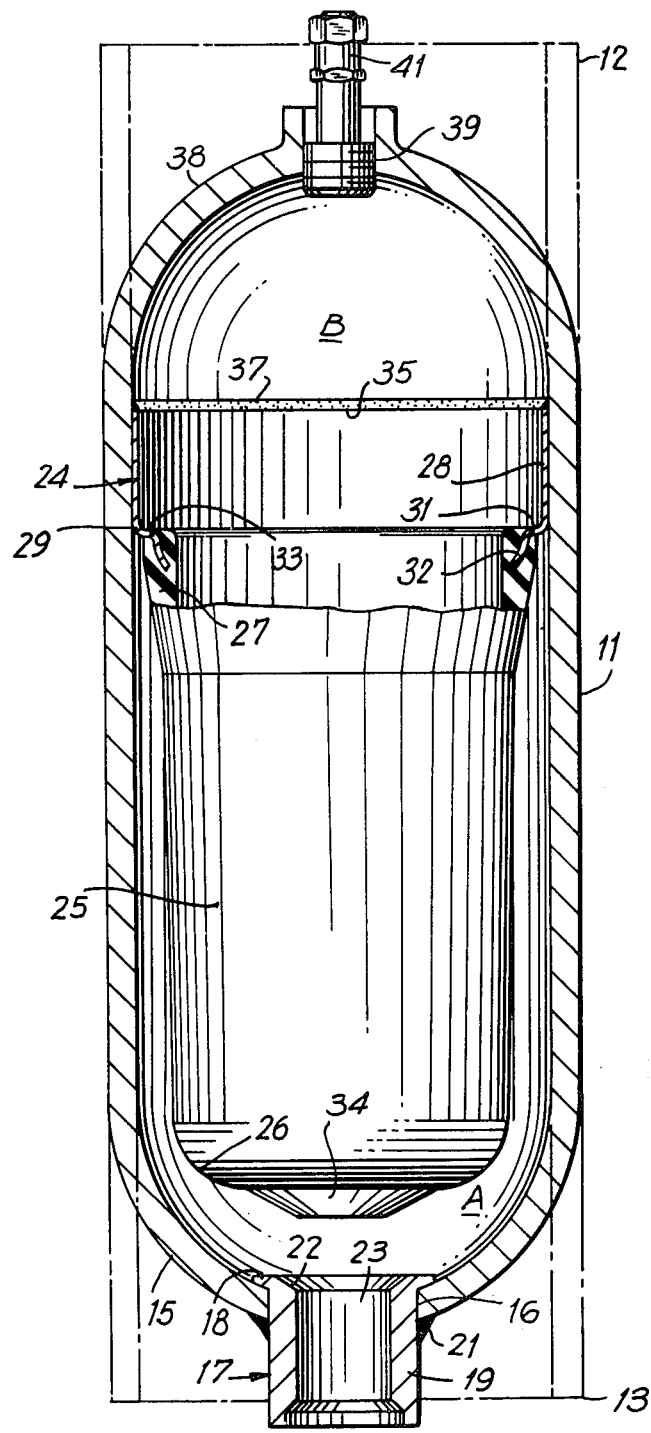

METHOD OF FORMING A PRESSURE ACCUMULATOR

This application is a division of copending application Ser. No. 552,227, filed Feb. 24, 1975.

This invention relates to the art of pressure vessels and method of forming same and more particularly to a pressure accumulator of the type having a rigid casing with a deformable separator therein in the form of a bladder defining two chambers, one of which is charged with gas under pressure and the other of which is charged with oil under pressure.

As conducive to an understanding of the invention it is to be noted that in the forming of a pressure accumulator of the above type, where the accumulator comprises a casing of rigid material having one end closed with an oil port defined in such closed end, and the other end defining an open mouth which is closed by a separate plug having an axial opening to receive a gas charging valve by means of which the gas chamber defined by the separator or bladder positioned in the casing may be charged with gas under pressure, where the plug has to be machined and secured in the open mouth of the casing as by welding or by spinning or rolling the open mouth of the casing over the periphery of the plug or by similar means, the cost of manufacture is considerable.

It is accordingly among the objects of the invention to provide a pressure accumulator of the above type which may readily be manufactured at relatively low cost with the use of relatively inexpensive components which may readily be formed and which dispenses with the need of a separate closure plug to seal the open end of the casing.

According to the invention these objects are accomplished by the arrangement and combination of elements hereinafter described and more particularly recited in the claims.

In the accompanying drawing in which is shown one of various possible embodiments of the several features of the invention, the single FIGURE shows a longitudinal sectional view of the pressure accumulator.

Referring now to the drawings, the accumulator comprises a cylindrical sleeve 11 of rigid material such as steel, capable of withstanding the pressure to which the accumulator will be subjected in use.

Initially, both ends of the sleeve 11 are open as at 12 and 13. In forming the accumulator, the open end 13 of the sleeve 11 is deformed inwardly, for example, by spinning, rolling or by hot forming in a press to provide a substantially hemispherical end 15, the latter having an axial opening 16 therethrough. An oil port fitting 17 in the form of a sleeve having an annular flange 18 at one end, is inserted through the open end 12 of the sleeve 11 and positioned in opening 16 so that the cylindrical body 19 of the fitting 17 protrudes from opening 16 with flange 18 resting on the inner periphery of opening 16. The fitting 17 is then secured in position as by welding as at 21. The periphery 22 of the inner end of bore 23 of fitting 17, which defines the oil port of the accumulator is beveled as shown to define a valve seat.

Thereupon, an annular supporting member 24 of resilient sheet metal having a deformable partition in the form of a bladder 25, preferably molded integrally therewith, is inserted through the open end 12 of the sleeve 11. The bladder 25 which is of natural or synthetic rubber having like characteristics has a closed end 26 and an open mouth having a thickened rim 27.

More particularly, the supporting member 24 has a substantially cylindrical retaining portion 28 of outer diameter just slightly larger than the inner diameter of sleeve 11 so that the supporting member 24 may be force-fitted into the sleeve as shown in the drawing.

The inner end 29 of the retaining portion 28 is inwardly bent as at 31 to define an annular shoulder and an annular lip or mounting portion 32 depends from the inner periphery 33 of the annular shoulder 31 and is inclined inwardly slightly as shown, the thickened rim 27 of the bladder 25 being molded to said mounting portion 32.

The closed end 26 of the bladder 25 has secured thereto, preferably by molding, a rigid valve member 34 adapted to move against the beveled seat 22 to close the oil port 23 during operation of the accumulator thereby preventing extrusion of the bladder.

To provide a seal between the oil normally charged into the chamber A on one side of the bladder 25 and the gas normally charged into the chamber B on the other side or the interior of the bladder, the outer edge 35 of the retaining portion 28 is secured to the inner surface of the sleeve 11 as at 37 as by welding or by fusing. This may readily be accomplished through the open end 12 of the sleeve 11.

Thereupon, the end 12 of the sleeve 11 is deformed inwardly for example, as by spinning, rolling or hot forming in a press to provide a substantially hemispherical end 38 for the accumulator, said end having an axial opening 39 which is tapped to receive a conventional gas charging valve 41.

With the arrangement and method above described, a pressure accumulator of the type having a deformable bladder therein may be provided with the use of relatively inexpensive metal stock such as a pipe or sleeve to form the outer casing or shell of the accumulator and particularly to form the end closure for the gas chamber of the accumulator thereby dispensing with the need for relatively expensive end closure caps therefor which often require precision machining.

Having thus described my invention, what I claim as new and desire to secure by Letters Patent of the United States is:

1. The method of forming a pressure vessel of the type having a deformable separator therein, from an elongated cylindrical rigid metal sleeve having at least one open end, which comprises the steps of inserting an annular supporting member of resilient sheet metal having a cylindrical retaining portion with an annular mounting portion at one end to which the periphery of said deformable separator is bonded into said cylindrical sleeve through said at least one open end so that the cylindrical retaining portion of the supporting member is in juxtaposition to the inner wall surface of the cylindrical sleeve in spaced relation to said open end, thereafter bonding said retaining portion to said sleeve and thereafter deforming inwardly said at least one open end of said sleeve to close such end and thereafter forming an axial opening in said now closed end.

2. The method set forth in claim 1 in which one of said open ends of the sleeve is first deformed inwardly to close such open end, and the annular supporting member with the separator bonded thereto is inserted into the sleeve through the other end thereof.

3. The method set forth in claim 2 in which a fitting having a cylindrical body portion with a radially outwardly extending flange is positioned in the axial opening formed in the end of the sleeve which is first deformed inwardly so that the body portion of the fitting protrudes from such opening with the flange resting on the inner periphery thereof, said fitting is thereupon secured in fixed position in said opening, said annular supporting member with the bladder bonded thereto is then inserted into the sleeve through the other end thereof, and such other end is thereupon deformed inwardly to close the latter.

4. The method of forming a pressure accumulator of the type having a deformable bladder therein, the bladder having an enlarged diameter mouth and a closed end which comprises in sequence the steps of deforming inwardly one of the ends of an elongated cylindrical sleeve to form a substantially hemispherical closed end having an axial opening, thereafter inserting through the open end of said sleeve a fitting having a cylindrical body portion with a radially outwardly extending flange at one end into position in said opening so that the body portion of the fitting protrudes from said opening with the flange resting on the inner periphery of the opening, securing said fitting in fixed position, thereafter inserting an annular supporting member of resilient sheet metal having a cylindrical side wall and having the mouth of the deformable bladder bonded to one end thereof, into an intermediate position within said cylindrical sleeve so that the cylindrical side wall of the annular supporting member is in juxtaposition to the inner wall surface of said sleeve and thereupon deforming inwardly the other end of the sleeve to form a second substantially hemispherical closed end portion having an axial opening.

5. The method set forth in claim 4 in which the axial opening in the second hemispherical end portion defines a gas charging port, said port is tapped and a gas charging valve is screwed into said tapped port.

6. The method set forth in claim 4 in which the other end of said cylindrical side wall of the annular supporting member is fused to the inner surface of said cylindrical sleeve to form an annular seal.

* * * * *